Nov. 28, 1944.  O. F. SOETBEER  2,363,701
INSPECTOSCOPE
Filed Nov. 17, 1943
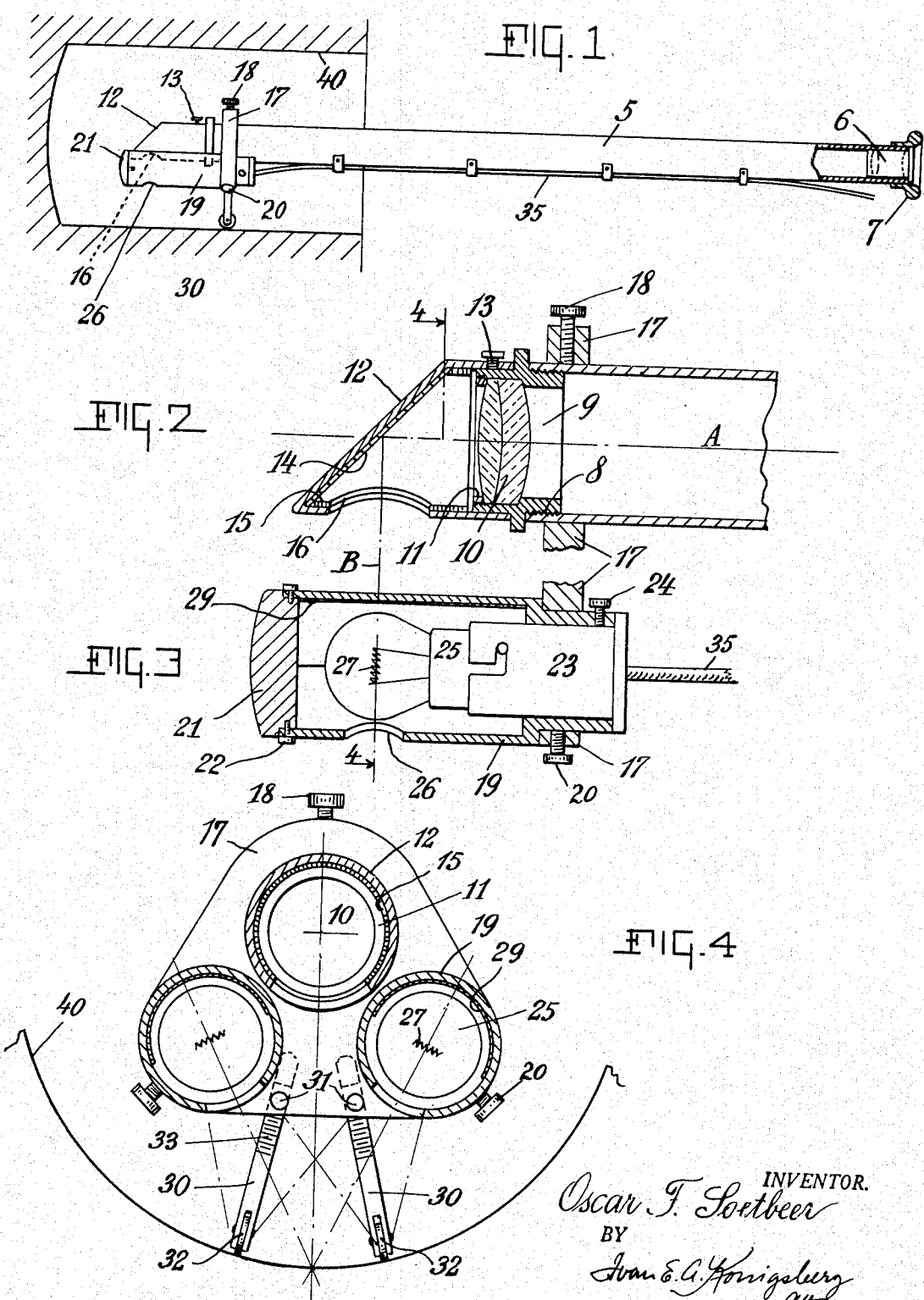
INVENTOR.
Oscar F. Soetbeer
BY
Ivan E. A. Konigsberg
Atty Patented Nov. 28, 1944

2,363,701

UNITED STATES PATENT OFFICE 2,363,701

INSPECTOSCOPE

Oscar F. Soetbeer, Massapequa Park, N. Y.

Application November 17, 1943, Serial No. 510,840

3 Claims. (Cl. 88—71)

This invention relates to a portable hand instrument for inspecting the internal surfaces in cylinders and like objects and the object of the invention is to provide an instrument especially well adapted for the purpose of inspecting internal surfaces in aircraft and other engine cylinders during the honing operations upon such cylinders. The instrument may, of course be used for inspecting internal surfaces in other hollow objects.

The invention is embodied in a microscope tube provided with a microscope optical system for visually inspecting a magnified image of the area to be examined. The tube carries illuminating means which are adjustable for proper illumination of the field of view. The forward end of the instrument is provided with supporting legs. In the accompanying drawing illustrating the invention Fig. 1 is a side view of an inspectoscope embodying the invention with parts in section and showing the instrument in operative position within a cylinder.

Fig. 2 is a vertical sectional view through the objective forward end of the microscope tube.

Fig. 3 is a vertical sectional view through one of the lamp tubes.

Fig. 4 is a view in cross section taken on the line 4—4 of the combined Figures 2 and 3.

The instrument comprises a relatively long microscope tube 5 having at its outer end an eye piece 6 surrounded by a cushion eye cup 7. The eye piece 6 is held frictionally in the tube so that it may be removed and replaced with another eye piece of different magnification if desired. As seen in Fig. 2 the front end of the tube is threaded as at 8 to receive an objective 9 with objective lenses 10. The latter are held in place by a ring 11. A mirror holder 12 fits tightly upon the objective and is kept in position by a set screw 13. The mirror holder is fitted with a reflecting mirror 14 held in place by a thin sleeve 15 as shown. The mirror is inclined at an angle of forty-five degrees to the optical axis A of the microscope system. An opening 16 is provided in the tube opposite the mirror for the passage of reflected light image rays from the surface to be inspected.

The microscope tube 5 carries a bracket 17 secured by a set screw 18. Below and to both sides of the mirror holder the bracket 17 carries two lamp tubes 19, 19 which are rotatably adjustably held in the bracket by set screws 20. Each lamp has a removable forward cushion button 21 held by set screws 22. The lamp tube carries a lamp socket 23 held by a set screw 24. Into the lamp socket is removably fitted a small electric lamp 25 by a bayonet joint connection. The lamp tube has an opening 26. The parts are so designed that the two openings 16 and 26 and the filament 27 of the lamp are in alinement in the vertical plane of the axis B which is perpendicular to the optical axis A of the microscope and at an angle of forty-five degrees centrally to the mirror 14 as shown. The lamp tube is provided with a reflecting surface 29 opposite the opening 26. The lamp cord 35 is held close to the tube 5 by suitable clamps as shown in Fig. 1.

The bracket 17 carries two legs 30, 30 held in lengthwise adjustable relation to the bracket by set screws 31. The legs have guiding wheels 32 and may be calibrated as at 33 so that the angle of incident light under which the surface is being inspected may be determined and controlled which is important for obtaining the maximum details of the surface construction.

The instrument is so designed and proportioned that it may conveniently be held and used as a hand instrument. Before inserting it into a cylinder as shown at 40 in Fig. 1, the lamps are adjusted circumferentially as shown in Fig. 4 and axially as shown in Fig. 3 to bring the filaments 27 into a position to provide maximum illumination upon the field of view as shown in Fig. 4. The legs serve to support the forward end of the instrument in the proper spaced relation to the internal surface and also takes the weight off the instrument for the convenience of the operator. The outer end of instrument is held by the operator who looks through the eye piece to observe the condition of the internal surface. During the operation the instrument is easily moved backwards and forwards. Depending upon the diameter of the cylinder the instrument may be tilted, the wheels 32 serving as pivots as will be understood. The instrument has been found to be particularly well adapted for checking and observing the result of a honing operation and the cylinder need not be removed from the honing machine for this purpose. The cushion surrounding the eye piece protects the eye of the operator. The cushion buttons 21 protect the end of a cylinder against scratching by the instrument and protects the instrument as will be understood.

I claim:

1. In an instrument for inspecting the internal surface in a hollow body, a straight tub having its forward end closed by an inclined wall, a microscope optical system in said tube spaced a distance from said inclined wall, an objective opening in the tube intermediate said wall and said system, a mirror on said inclined wall for reflecting an illuminated image of a portion of the surface to said optical system, a bracket carried by said tube adjacent its forward end rearward of said opening, an electric lamp mounted in said bracket on each side of said tube with the focal points of said lamps in vertical alinement with the vertical axis of said objective opening, a rotatable lamp tube enclosing each of said lamps, light openings in said lamp tubes for directing the light rays from the lamps upon said surface in optical operative relation to the said objective opening and to the said mirror and set screws for adjustably securing said lamp tubes to the said bracket.

2. An instrument according to claim 1 including supporting legs adjustably secured to said bracket and extending below the same for spacing the optical axis of the optical system in predetermined optical operative relation to the surface to be inspected.

3. An instrument according to claim 1 including cushioning buttons detachably secured in the forward ends of the lamp tubes.

OSCAR F. SOETBEER.